United States Patent
Haskins

[15] 3,666,129
[45] May 30, 1972

[54] DETACHABLE STORAGE BIN AND TRAILER

[72] Inventor: Roy Haskins, P.O. Box 4215, Station B, Spokane, Wash. 99202

[22] Filed: Feb. 16, 1970

[21] Appl. No.: 11,609

[52] U.S. Cl.............................................214/515, 280/43.11
[51] Int. Cl..........................................................B60p 1/02
[58] Field of Search......................214/501, 506, 515, 2, 512; 280/43.11

[56] References Cited

UNITED STATES PATENTS

| | | | |
|---|---|---|---|
| 3,348,572 | 10/1967 | Hall | 137/344 |
| 3,251,497 | 5/1966 | Simas | 214/515 |
| 3,155,248 | 11/1964 | Haller | 214/501 X |
| 3,271,042 | 9/1966 | Flodin | 214/506 X |

Primary Examiner—Albert J. Makay
Attorney—Wells, St. John & Roberts

[57] ABSTRACT

A detachable storage bin and trailer assembly is described having a storage bin that is releasably, pivotally attached to a trailer. The trailer frame can be lowered to the ground to provide a sturdy support for erecting the storage bin. After the bin is erected release pins are pulled to detach the storage bin from the trailer.

1 Claim, 4 Drawing Figures

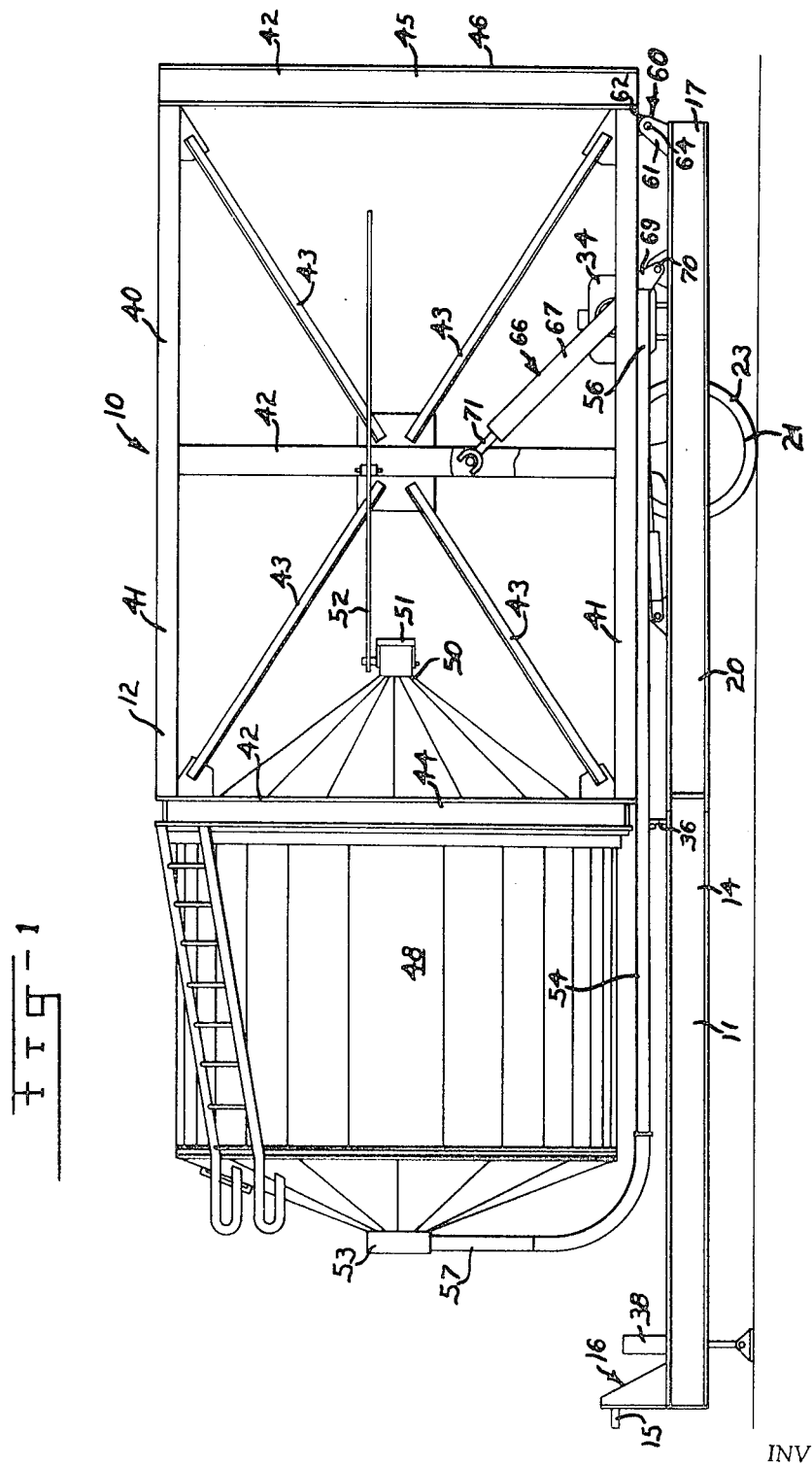

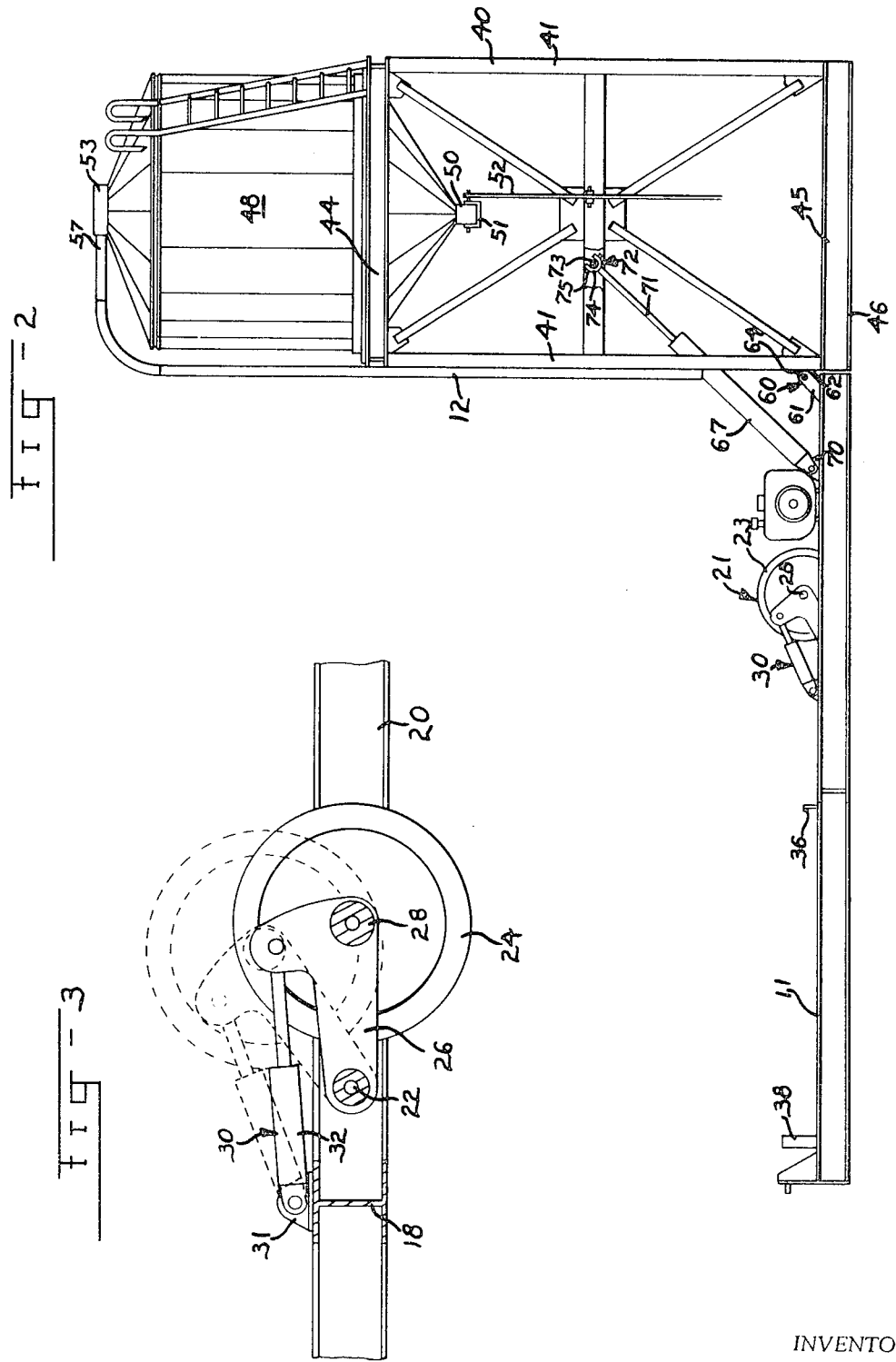

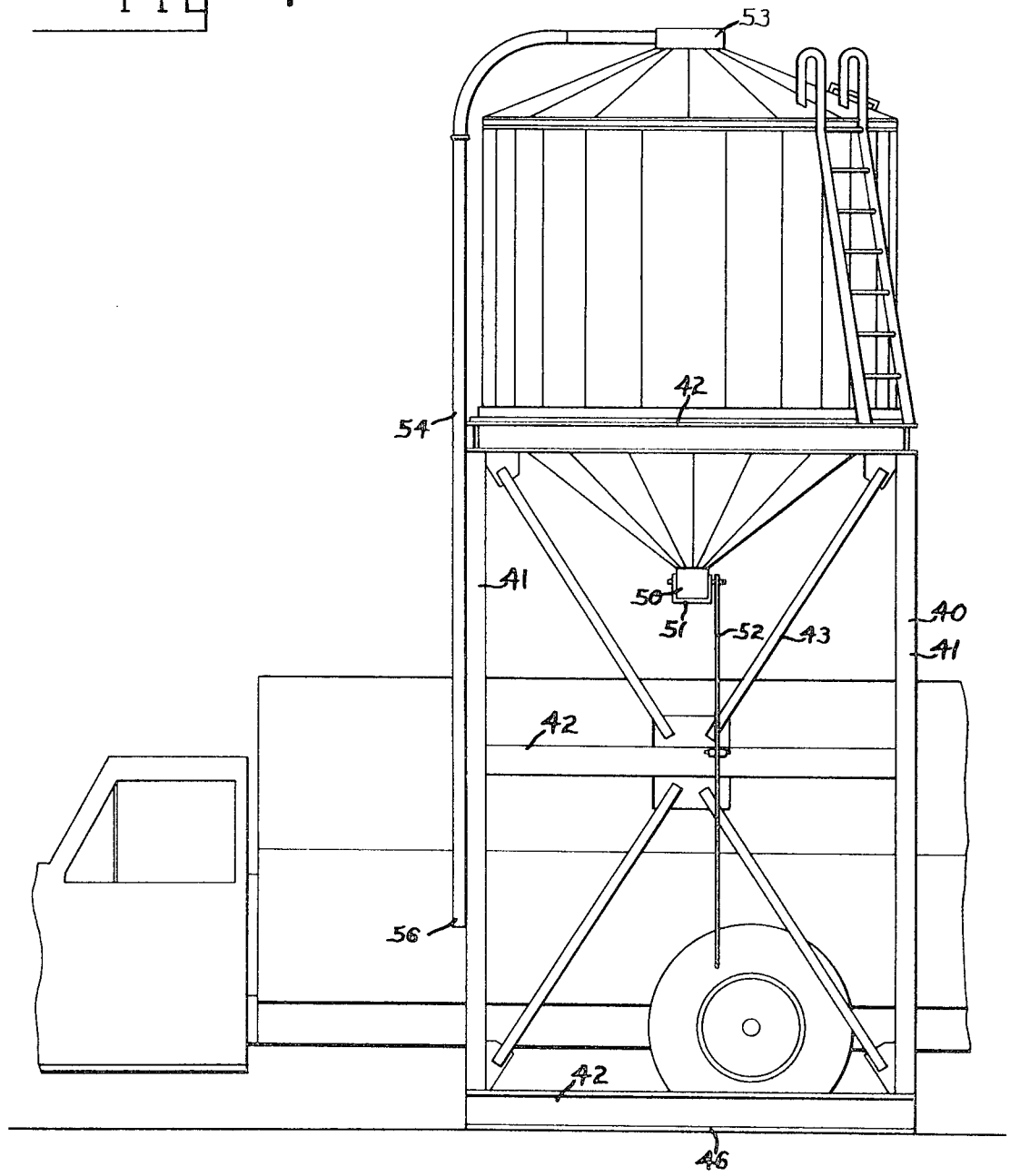

DETACHABLE STORAGE BIN AND TRAILER

BACKGROUND OF THE INVENTION

This invention relates to storage bins and more particularly to a combination storage bin and trailer assembly that are detachable.

The transportation and storage of agricultural chemicals and fertilizers present a substantial logistics problem to the manufacturer and processor of such materials to be able to have on hand sufficient amounts of the product to meet the seasonal demand. In the past the chemicals have been shipped from the factory to strategically located blending plants disbursed throughout the agricultural region. From here the farmer was generally required to pay for the chemical F.O.B. the blending plant. This required the farmer to drive his 6-ton spreader trucks to the blending plant to receive each load. Frequently the farmer required in the neighborhood of 100 tons of agricultural chemicals and fertilizer. This meant that the farmer would have to make over 10 trips to and from the blending plant to meet his requirement. This generally added a substantial expense to the farmer and required a considerable amount of time.

One of the principal objects of this invention is to provide a detachable storage bin and trailer combination having a storage tank of approximately 100 tons that may be readily moved to the farmer's location whereupon the trailer bin can be detached leaving the trailer portion to be used for transportation of other storage bins while the deposited storage bin is in use. Such an apparatus provides a considerable savings to the farmer and minimizes the logistics problem normally encountered by the blending plant operator. In this manner, the processor can deliver directly to the farmer's door step to fill the storage bin.

An additional object of this invention is to provide a detachable storage bin and trailer assembly in which the trailer bin can be erected and detached with a minimum of effort.

A further object of this invention is to provide a detachable storage bin and trailer assembly that has a mechanism for lowering the trailer frame to the ground to provide a substantial support platform on which the storage bin can be erected with a minimum of risk of being tipped over.

An additional object of this invention is to provide such an assembly that can be readily manufactured and which requires substantially no maintenance.

A further object of this invention is to provide a detachable storage bin and trailer assembly in which the storage bin has a minimum of moving parts which have to be maintained.

These and other objects and advantages of this invention will become apparent upon the reading of the following detailed description of a preferred embodiment.

BRIEF DESCRIPTION OF THE DRAWINGS

A preferred embodiment of this invention is illustrated in the accompanying drawings, in which:

FIG. 1 is a side elevational view of a detachable storage bin and trailer assembly in the transporting configuration;

FIG. 2 is a side elevational view of the storage bin and trailer assembly showing the storage bin section being erected;

FIG. 3 is a fragmentary detailed view of a wheel assembly for supporting the trailer section of the assembly; and FIG. 4 is a side elevational view showing the storage bin section detached from the trailer with an agricultural spreading truck extending through the bin underneath a storage tank for receiving agricultural fertilizer therefrom.

DETAILED DESCRIPTION OF A PREFERRED EMBODIMENT

Now referring in detail to the drawings, there is shown in FIG. 1 a detachable storage bin and trailer assembly 10 having as its principal components—a transporting trailer 11 and a storage bin 12.

The transporting trailer 11 has an elongated frame 14 that extends from a hitch 15 at the front end 16 to a rear end 17. The frame has longitudinal members 20 with cross members 18 (FIG. 3) extending therebetween to provide substantial rigidity.

A wheel assembly 21 is mounted on the elongated frame 14 for pivotal movement about a pivot axle 22 (FIG. 3) that extends between the longitudinal members. The wheel assembly 21 includes wheels 23 and 24 that are rotatably mounted on wheel axles 28. The axles 28 are fixed to assembly arms 26. Lowering means 30 is operatively connected to the wheel assembly 21 for raising the wheel assembly and the wheels 23 and 24 to lower the elongated frame 14 to the ground when the storage bin and trailer assembly has been transported to the desired location. The lowering means 30 includes brackets 31 that are affixed to a cross member 18 and hydraulic cylinders 32 mounted on the brackets 31 and connected to the arms 26 as shown in FIG. 3 for pivoting the wheel assembly about the pivot axle 22 to raise the wheels 23 and 24 and lower the frame to the ground to provide ground support for the erection of the storage bin 12.

A hydraulic pump unit 34 is mounted on the trailer for providing a source of power. A front hydraulic jack 38 is mounted on the frame 14 for raising and lowering the front of the trailer.

A cross brace 36 is mounted across the front end of the transporting trailer 11 to support the upper end of the storage bin when the storage bin is in a transporting position as shown in FIG. 1.

The storage bin 12 includes a rectangular box frame 40 having longitudinal members 41 interconnected by cross members 42. Brace members 43 interconnect the longitudinal members and cross members on two opposing sides of the box frame leaving an open passageway or opening transversely through the box frame of a sufficient size to enable an agricultural spreader truck to drive through the opening when the bin is erected as shown in FIG. 4.

The rectangular box frame 40 has a top end 44 and a bottom end 45. The bottom end 45 has a base 46 for engaging the ground when the storage bin is erected to provide a foundation of the storage bin.

A cylindrical storage tank 48 is rigidly mounted to the top end 44 of the frame for receiving the agricultural chemical or fertilizer. The storage tank has a lower discharge opening 50 for discharging agricultural chemicals or fertilizers into a spreader truck that is positioned in the opening as shown in FIG. 4. The opening 50 has a clamshell-valve 51 affixed thereto with a handle 52 for opening and closing the valve. A feeder cap 53 is formed on the top of the storage tank 48 for facilitating the feeding of the agricultural chemicals or fertilizers into the storage tank. The storage bin has a feeder tube 54 with a lower end 56 fixed to a longitudinal member at a convenient location accessible to an operator that is standing on the ground. The feed tube extends upwardly with the upper end 57 terminating at the feeder cap.

The detachable storage bin and trailer assembly includes a releasable pivot connection 60 that normally interconnects the transporting trailer 11 and the storage bin 12 and which enables the storage bin to be pivoted upwardly from the transporting position to an upright storage position shown in FIG. 2. When the storage bin is erected with the base 46 supported on the ground, the pivot connection 60 can be released to disconnect the storage bin from the trailer. The releasable pivot connection includes brackets 61 affixed to the trailer frame adjacent the rear end 17. Corresponding brackets 62 are affixed to the sides of the frame 40 spaced from the base 46. Removable pins 64 extend through the brackets 61 and 62 defining a pivot axis about which the storage bin is pivoted during the erection process. The detachable storage bin and trailer assembly 10 further includes a power means 66 mounted on the trailer for erecting the storage bin at the desired site and for reloading the storage bin on the trailer when the storage bin has served its purpose.

The power means 66 includes hydraulic cylinder 67 having their base end 69 pivotally affixed to brackets 70. The bracket 70 are affixed to the trailer frame spaced from the pivot connections 60 to provide a moment arm for swinging the storage bin to the erected position. The hydraulic cylinders 67 have piston rods 71 that are connected through a releasable connection 72 (FIG. 2) to stud shafts 73 affixed to cross members of the storage bin frame. The releasable connection includes a bracket 74 affixed to the piston rod ends 71 and a pin 75 that extends through the bracket and the stud shaft 73. After the storage bin is erected, the pin 75 may be removed to disconnect the hydraulic cylinders from the storage bin.

When a farmer orders a large quantity of agricultural chemicals or fertilizer, the supplier will transport a detachable storage bin and trailer assembly to a location convenient to the farmer. When the detachable storage bin and trailer assembly is at the desired location, the operator activates the hydraulic cylinders 32 and the front jacks 38 to lower the trailer frame 14 to the ground to provide ground support for the erection of the storage bin to minimize the possibility of the storage bin tipping over. After the frame is resting on the ground, the hydraulic cylinders 67 are operated to pivot the storage bin from the transporting position shown in FIG. 1 to the erected upright position shown in FIG. 2. Since the brackets 70 are spaced from the pivot connection 60 a moment arm is provided, enabling the storage bin to be erected with cylinders having a minimum length. When the storage bin has been fully erected, the base 46 rests on the ground rearward of the rear end 17. At this point the trailer may be detached from the storage bin by moving the pivot pins 64 and cylinder pins 75.

Now the storage tank 48 is ready to be filled. The agricultural chemical or fertilizer supplier then transports large semi-trucks to the location and fills the tank 68 through the feed tube 54 utilizing a vacuum blower system. Such a system makes it possible to have a storage tank that can be easily maintained with no moving parts other than the clamshell-valve 51.

When it is desired to utilize the agricultural chemical or fertilizer stored in the storage tank 48, a spreader truck is driven through the frame opening to position the spreader tank directly underneath the discharge opening 50. The operator then opens the clamshell-valve 51 to permit the agricultural chemical or fertilizer to fill up the spreader truck. This process is continued until the requirements of the farmer are met.

Such a system substantially reduces the logistics problem presented to the agricultural chemical or fertilizer supplier and the transportation costs normally borne by the farmer.

Although this invention may appear to be very simple in retrospect, it has only been devised after a great deal of trial and error and experimentation which was not forecasted by the prior art.

It should be appreciated that the above described embodiment is simply illustrative of the principals of this invention. Only the following claims are intended to define the invention.

What is claimed is:

1. A detachable storage bin and trailer assembly comprising:
    a trailer having an elongated frame extending from a hitch end to a rear end, said trailer frame including structural members extending to the frame rear end and having coplanar lower surfaces for ground engagement;
    elevationally adjustable wheel assemblies mounted to the trailer frame;
    first power means connected between the trailer frame and said wheel assemblies for selectively moving said wheel assemblies relative to the trailer frame between a first elevational position at which the lower surfaces of said frame structural members are elevated above the ground and a second elevational position at which the lower surfaces of said frame structural members are in ground contact;
    an elongated storage bin assembly including a storage tank and a base surface at the outer end of the assembly for ground engagement when the storage bin assembly is in an upright erect storage position, the storage bin assembly including a support frame mounting said tank and having a transverse opening formed therethrough of sufficient size to enable a truck to be driven therethrough when the storage bin assembly is in its upright erect storage position and is detached from the trailer;
    a releasable pivot connection normally interconnecting the outer end of the storage bin assembly to the rear end of the trailer frame about a fixed transverse axis on the trailer frame elevationally above and parallel to the lower surfaces of said trailer frame structural members, said outer end of the storage bin assembly being extended outward from said axis a distance equal to the elevational distance between the axis and the lower surfaces of said trailer frame structural members; and
    second power means on the trailer releasably connected to the storage bin assembly for selectively positioning the storage bin assembly about said axis between an erect upright storage position with said base surface in ground engagement and a horizontal transport position resting upon the trailer frame, said second power means comprising an extendable cylinder assembly releasably connected to the trailer frame about a fixed axis parallel to and forward of said transverse axis and to the storage bin assembly about a fixed axis parallel to and inward from said transverse axis.

* * * * *